Sept. 16, 1958  C. H. HOLSCLAW  2,852,038
HERMETICALLY SEALED VALVE
Filed Nov. 2, 1953
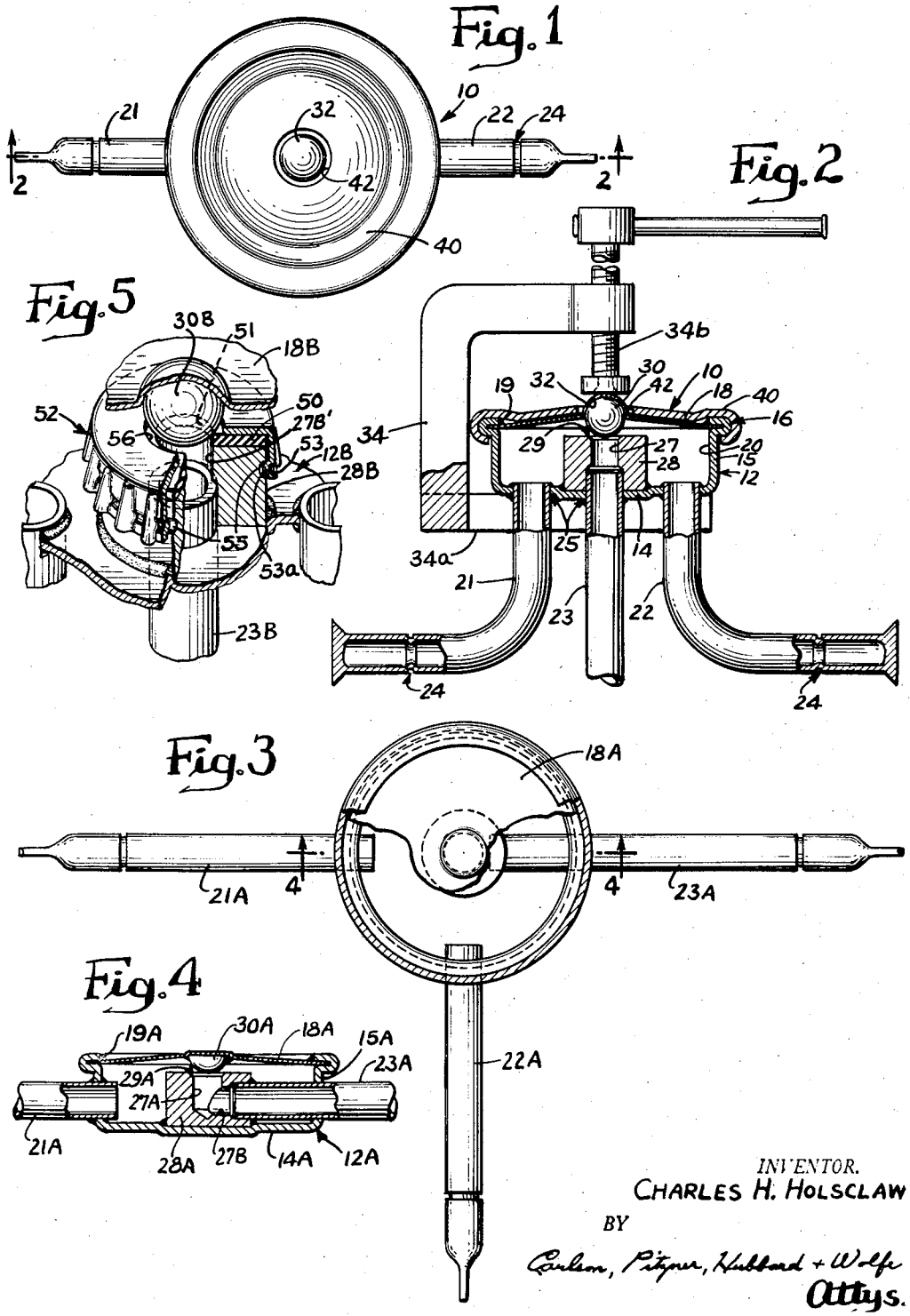
INVENTOR.
CHARLES H. HOLSCLAW
BY
Carlson, Pitzner, Hubbard + Wolfe
Attys.

United States Patent Office 2,852,038
Patented Sept. 16, 1958

2,852,038

HERMETICALLY SEALED VALVE

Charles H. Holsclaw, Evansville, Ind.

Application November 2, 1953, Serial No. 389,732

1 Claim. (Cl. 137—561)

The present invention relates generally to valves and especially to valves finding particular utility in the manufacture, installation, and servicing of refrigerating systems.

Refrigerating systems usually consist of a motor-compressor assembly, a condenser, an evaporator and the connecting lines therebetween. Of these units, it is the motor-compressor assembly, which includes the compressor and the driving motor therefor, that most frequently requires servicing and replacement. Further, it is this assembly that is the most difficult to process during its manufacture. Such processing includes leak testing, dehydration, evacuation and charging. Leak testing is obviously important to prevent contamination and to prevent loss of refrigerant. Dehydration is important so as to remove such contaminating material as water vapor and the like which may have collected on internal surfaces of the compressor during the fabrication thereof and which, if not removed, would lead to corrosion and freeze-up of the device. During leak testing and decontamination, the device is subjected to both high and low pressures and dry air or nitrogen may be used both to locate leaks and to "sweep" the system of water vapor or the like. In order to remove the air or nitrogen prior to charging the device with oil and refrigerant, evacuation is effected. Normally leak testing and dehydration are accomplished at the factory at the time of manufacture of the device primarily as a matter of convenience. Furthermore, since it is frequently necessary to effect field replacement of motor-compressor assemblies and since the amount of oil and refrigerant in a refrigerating system is relatively critical, it is a relatively simple matter for the motor-compressor assembly manufacturer to pre-charge the compressor with the proper amount of oil and refrigerant. This substantially simplifies the serviceman's job because he has but to remove the defective motor-compressor component from a refrigerating system, connect in the new motor-compressor component, evacuate the remainder of the system, cap the evacuation line and then allow refrigerant with which the new motor-compressor component is pre-charged to enter the rest of the system.

In view of the foregoing, it is apparent that the various compressor lines need to be equipped with valving means to maintain pressures within the assemblies and to prevent contamination, especially the entry of moisture-laden air.

There are numerous forms of valves presently in use for these purposes. However, such valves as are presently available commonly utilize flare nuts or the like to attach the lines from the various components in the system into threaded ports in the valve, and generally such valves have packed stems. These valves commonly have four potential leak points, one at each of the three flare nut connections between the tubes or lines and the valve casing and one about the valve stem itself. Furthermore, it is hazardous to heat pre-charged motor-compressor units and the accessory components thereof so as to effect silver-soldering or brazing between the tubes or lines and the valve body. More particularly, the application of heat to effect silver-soldering or brazing of lines to conventional valves is likely to damage the packing and diaphragms thereof.

Accordingly, it is an object of the present invention to provide in a valve, especially adapted for use in the manufacture, installation and servicing of refrigerating systems, a construction whereby the aforementioned difficulties, especially with regard to potential leaks, are eliminated, and which permits of positive closure so as to interrupt communication between a compressor line and lines adapted to communicate with the processing equipment and with the remainder of the components of the refrigerating system. It is a related object to provide a valve construction of the aforementioned character which facilitates leak-proof connection thereof in a refrigerating system, and which is characterized by its extreme simplicity so as to permit of economical manufacture.

The objects of the invention thus generally set forth together with other objects and ancillary advantages are obtained by the construction and arrangement shown by way of illustration in the accompanying drawings in which:

Figure 1 is a plan view of a valve embodying the instant invention.

Fig. 2 is a central vertical section taken substantially in the plan of line 2—2 in Fig. 1.

Fig. 3 is a plan view partly in section, of a modified form of valve embodying the features of the instant invention; and Fig. 4 is a fragmentary central vertical section taken substantially in the plan of line 4—4 in Fig. 3.

Fig. 5 is a fragmentary perspective view partly in section of still another modified form of valve embodying the features of the present invention.

While the invention is susceptible of various modifications and alternative constructions, there are shown in the drawings and will herein be described in detail certain preferred embodiments, but it is to be understood that it is not intended to limit the invention to the forms disclosed. On the contrary, it is intended to cover all modifications and alternative constructions falling within the spirit and scope of the invention as expressed in the appended claim.

Referring more particularly to Figs. 1 and 2, inclusive, of the drawing, there shown for purposes of illustration is a valve 10 embodying the features of the present invention and intended for insertion in a refrigerating system as for example, adjacent the motor-compressor component thereof. As shown, the valve includes a generally cup-shaped body 12, which is preferably formed as a die-stamping from a single metal blank, and having a bottom wall 14 and an integral side wall 15. The latter is outwardly flared and turned back upon itself at 16 so as to firmly grip a flexible metallic diaphragm 18 by means of which the interior of the body is closed. In addition to the mechanical crimping of the edge 16 of the side wall 15 of the body 12 against the peripheral edge portion of the diaphragm 18, the joint between these two elements is soldered as indicated at 19 to insure sealing. Thus the body and the diaphragm define a closed chamber 20.

In order to provide means for connecting the valve to the components of a refrigerating system the instant valve is provided with a plurality of tubes, here shown in the present embodiment as being three in number, 21, 22 and 23. These tubes at their outer ends are crimped closed and are preferably soldered so as to seal the same. To facilitate connection thereof to the various lines of the refrigerating system, each of the tubes, spaced from the outer ends thereof, are scored as at 24, so that they may be readily severed to permit removal of the crimped and sealed portions.

To receive the tubes 21, 22 and 23, the bottom wall 14 of the valve body 12 is apertured and the opposite ends of the tubes are inserted therein. Preferably the inserted tube ends are sealed in place by silver-brazing or the like as at 25.

Preferably the inner end of the central tube 23 is received within a bore 27 in a member 28, which is made rigid with the body 12 as by silver-brazing to the bottom wall 14 thereof about the central aperture therein. The portion of the member 28, surrounding the inner end of the bore 27, defines a valve seat 29. Preferably therefore, the outer end of the bore is outwardly flared slightly.

As shown, the illustrative valve includes a valving element 30 which is of spherical form and is mounted centrally of the flexible diaphragm 18 which closes the top of the valve body 12. To facilitate mounting of the valve element 30, the diaphragm 18 is provided with a concave recess 32 for the reception of the upper portion of the element 30, the latter being permanently secured thereto. Preferably, this is accomplished by soldering or brazing with a material having a somewhat higher melting point than that used to effect the seal at 19.

Since it is necessary that the valve be closed only at various times during the processing of the equipment component to which it is attached and, after its installation, while the remainder of the system is being processed, the valve 10 is desirably normally-open. Thus, the valve element 30 and its seat 29 are normally disposed in spaced relation to each other. This is accomplished in the illustrative form by fashioning the diaphragm 18 so that it is normally bowed upwardly, i. e. it is convex when viewed externally thereof.

In use, a valve of the type described will normally have the tube 23 permanently secured to a line or a fitting communicating with a motor-compressor assembly and the tubes 21 and 22, are respectively adapted for connection to process equipment and to the remainder of the refrigerating system. Further, external clamping means is provided to hold the ball valve element 30 in engagement with the seat 29 therefor. As shown, the clamping means may comprise a C-clamp 34 having a bifurcated jaw portion 34a to straddle the tubes 21, 22 and 23 and a screw 34b to engage the diaphragm 18 to depress the valving element 30 toward engagement with its seat 29. Thus, communication between the tube 23 and the chamber 20 within the valve body 12, and the system and processing tubes 22 and 21 is interrupted. Upon installation of the motor-compressor assembly, the system and process tubes 22 and 21 are respectively connected ot the remainder of the refrigerating system and to the processing equipment so as to permit the process equipment to decontaminate, dehydrate and evacuate the remainder of the system. Thereafter the process tube is crimped, and cut-off, and thereafter fused or silver-brazed to seal it. Subsequently the clamping means 34 is removed permitting the diaphragm to flex upwardly into its normal position thereby unseating the valving element 30 and establishing communication between the compressor assembly and the system tube 22.

With the compressor tube 23 of the valve 10 permanently connected to the motor-compressor assembly and the process and system tubes sealed off, the motor-compressor assembly can be shipped without need for the clamping means 34 while the device is in transit. However, clamping means must be applied in order to seat the valving element 30 prior to connection to processing equipment and the refrigerating system. Before doing so, the valve body may be heated to drive the refrigerant therefrom back into the compressor. In either event, the use of applicant's hermetically sealed valve prevents entry of contaminating matter and permits pre-charging of the motor-compressor assembly with a measured quantity of dry refrigerant and thus facilitating field installation.

Valves embodying the present invention also permit of incorporation in refrigerating systems wherein refrigerant is maintained at exceedingly high pressures which might unduly strain and flexible diaphragm 18. Therefore, illustrative embodiment of Figs. 1 and 2 has been incorporated in the retainer or reinforcing member 40. The retainer 40, as shown, comprises a disk-like member which is across the flexible diaphragm 18 and is peripherally crimped over the rim portion 16 of the valve body 12. Preferably, the retainer 40 is shaped complementally with respect to the diaphragm 18, so that the latter rests against it when the diaphragm is in its normal position. Centrally thereof, the retainer 40 is apertured as at 42 to accommodate the portion 32 of the diaphragm 18 which is provided to receive the valve element 30. Also, the aperture 42 permits engagement of the diaphragm portion 32 by the clamping means 34 so as to depress the valving element 30 into engagement with its seat 29.

In Figs. 3 and 4 there is illustrated a somewhat modified form of valve embodying the instant invention, the elements of which are functionally the same as those for the form previously described, however, are arranged somewhat differently. Thus similar elements are denoted by similar reference numerals with the addition of the suffix "A."

This form of invention is intended for use in locations where available space for disposition of the valve is somewhat different from that for the form previously described. Thus this form of the valve includes a cup-shaped body 12A having a bottom wall 14A and a side wall 15A. The top of the body 12A is closed by a flexible diaphragm 18A so as to define a closed internal chamber 20A. Centrally within the chamber 20 and rigid with the bottom wall 14A of the body 12A is a member 28A defining a valve seat 29A which a valving element 30A mounted on the diaphragm 18A is adapted to engage. In this form, process system and compressor tubes 21A, 22A and 23A respectively are arranged to project radially from the body 12A of the valve. Thus the side wall 15A of the valve body 12A is provided with peripherally spaced apertures for the reception of the inner ends of the tubes 21A, 22A and 23A and in which the tubes, adjacent their ends, are sealed as by silver-brazing or the like. The inner end of the compressor tube 23A is sealed in the end of a radially disposed bore 27B which intersects an axially disposed bore 27A in the member 28A. Thus it will be seen that this embodiment of the instant invention might be termed a "pancake" type valve and that its operation is substantially the same as that for the form previously described.

In Fig. 5 there is shown still another modified form of the instant invention. This form is intended for use in applications where it is desirable that a somewhat different valve seat be employed. More particularly, this form of valve includes a body member 12B having an annular member 28B secured therein defining a bore 27B' into one end of which opens a tube 23B. As in the forms previously described, the instant valve includes a valving element 30B carried by a flexible diaphragm 18B in juxtaposition with the end of the bore 27B' which communicates with the interior of the valve body 12 to define a seat for the valving element 30B. A washer-like resilient member 50 is affixed to the inner end of the annular member 28. The member 50 has a central opening 51 therethrough which registers with the inner end of the bore 27B of the member 28B. Preferably the member 50 is secured to the inner end of the member 28 by a retainer 52. The retainer is of generally annular form and as shown is formed from a sheet metal blank to provide a depending skirt 53. The skirt is adapted to be crimped about the inner end of the annular member 28B, the latter being provided with a peripheral groove 55 to receive inwardly extending portions 53a of the retainer skirt 53 which are effected upon crimping of the latter. Centrally of the retainer 52 is an aperture 56 which is substantially larger than the aperture 51 to permit passage of the valving element 30B therethrough into engagement in the opening 51 in the seat member 50.

In order not to damage the seat member 50 during fabrication of the instant valve, silver-soldering or brazing of the member 28B, the tube 23B and the other tubes in place in the valve body 12B, as may be required, is effected prior to the affixing of the seat member 50 in place on the member 28B. After this is done, the only remaining sealing operation to be effected is the sealing of the diaphragm 18B to the body 12B. Since such sealing can be effected by a relatively low melting point solder and since there is considerable heat conducting material (of the diaphragm 18B and of the body 12B) to conduct the heat away, there is substantially no danger of damage to the material of the resilient seat member 50 as this operation is accomplished.

From the foregoing it will be apparent that by the practice of the instant invention there is provided a valve which is characterized by its extreme simplicity permitting of economical manufacture. Further, valves embodying the features of the present invention absolutely minimize the danger of leakage therefrom since there are no threaded or packed joints. Furthermore, connection thereof into refrigerating systems, for example, is positively effected by means of tubes which are permanently sealed into the valve body and which require sealing for connection with the remainder of the system in which they are to be incorporated.

In the following claim, the term "tubular member" used for convenience is a member defining a central opening characteristics of a tube and of any desired wall thickness. The term "spherical" as applied to the valve member is intended to cover valve members in which the downwardly presented surface is substantially spherical or convex.

I claim as my invention:

A valve for operation by a C-clamp having a screw mounted clamping element and an opposing bifurcated jaw, comprising, in combination a cup-shaped sheet metal body, a flexible metallic diaphragm having a central concave portion therein and fitted over the open end of the body to define a chamber, said diaphragm and body having a permanent seal therebetween to hermetically seal said chamber, an upstanding tubular member within said chamber having a valve seat at its upper end and rigidly secured to said bottom wall at its lower end, said bottom wall having a bore therethrough for communicating with said tubular member, said body having a plurality of tubular connections spaced peripherally about said bore for sealed communication with said chamber, said bore and said tubular connections being in substantially alined relationship across the body to facilitate straddling thereof by the bifurcated jaw of the C-clamp, a substantially spherical valve member secured to the underside of said diaphragm and occupying a normal position housed within said central concave diaphragm portion and juxtaposed over said valve seat and spaced therefrom to permit normal communication between said tubular connections and said tubular member, a retainer rigidly secured to said body and snugly covering and reinforcing said diaphragm against deformation caused by excessive pressures within said chamber, said retainer having a central access opening therein alined with said central concave diaphragm portion and said valve member to provide access for the screw mounted clamping element of the C-clamp, said access opening being of sufficient diameter to permit extension thereinto of the entire contour of said central concave diaphragm portion for presenting substantially the entire outer surface of said diaphragm portion for engagement by the screw mounted clamping element of the C-clamp to compensate for any possible misalinement of the opposed C-clamping elements, and said body having a substantially flat bottom wall for seating the bifurcated jaw of the C-clamp and for resisting the axial reactive pressure of the screw so that upon tightening of the C-clamp the flexing of the diaphragm will move the valve member into sealing engagement with said seat for blocking communication between said tubular member and tubular connections and thus closing said valve and with any excess axial pressure being borne substantially by the tubular member.

References Cited in the file of this patent

UNITED STATES PATENTS

| | | |
|---|---|---|
| 999,457 | Kellar | Aug. 1, 1911 |
| 1,001,246 | Budlong | Aug. 22, 1911 |
| 1,093,117 | Deiller | Apr. 14, 1914 |
| 1,631,406 | Eisenhauer | June 7, 1927 |
| 1,691,602 | Ferrette | Nov. 13, 1928 |
| 1,859,834 | May | May 24, 1932 |
| 2,623,785 | Henchert | Dec. 30, 1952 |
| 2,648,351 | Curtis | Aug. 11, 1953 |
| 2,737,201 | St. Clair | Mar. 6, 1956 |

FOREIGN PATENTS

| | | |
|---|---|---|
| 319,936 | Great Britain | 1929 |